US007849325B2

(12) United States Patent
Arai et al.

(10) Patent No.: US 7,849,325 B2
(45) Date of Patent: *Dec. 7, 2010

(54) DEVICE, METHOD, AND COMPUTER PRODUCT FOR MATCHING BIOLOGICAL INFORMATION

(75) Inventors: Hiroo Arai, Kawasaki (JP); Kimikazu Ito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1347 days.

This patent is subject to a terminal disclaimer.

(21) Appl. No.: 11/333,210

(22) Filed: Jan. 18, 2006

(65) Prior Publication Data

US 2007/0050637 A1 Mar. 1, 2007

(30) Foreign Application Priority Data

Aug. 31, 2005 (JP) ............................ 2005-252742

(51) Int. Cl.
*G06F 21/00* (2006.01)

(52) U.S. Cl. ............................. 713/186; 726/9; 726/20

(58) Field of Classification Search ................. 713/186; 705/65, 69; 382/115; 235/382.5, 380; 726/35, 726/1, 9, 20; 708/135; 379/93.02
See application file for complete search history.

(56) References Cited

U.S. PATENT DOCUMENTS 5,030,807 A * 7/1991 Landt et al. ................. 235/375
5,365,048 A 11/1994 Komiya et al.
6,104,922 A 8/2000 Baumann
6,321,067 B1 11/2001 Suga et al.
6,636,620 B1 10/2003 Hoshino
6,709,333 B1 * 3/2004 Bradford et al. .............. 463/29
6,853,739 B2 * 2/2005 Kyle .......................... 382/115
7,059,531 B2 * 6/2006 Beenau et al. .............. 235/487
7,145,437 B2 * 12/2006 Jalkanen et al. ............ 340/10.3
7,360,689 B2 * 4/2008 Beenau et al. .............. 235/380
2004/0002894 A1 1/2004 Kocher
2004/0232222 A1 * 11/2004 Beenau et al. .............. 235/380
2004/0233037 A1 * 11/2004 Beenau et al. ............. 340/5.83
2004/0233038 A1 * 11/2004 Beenau et al. ............. 340/5.83

(Continued)

FOREIGN PATENT DOCUMENTS

CN 1075810 9/1993

(Continued)

OTHER PUBLICATIONS

Korean Notice of Allowance dated Aug. 6, 2007, Application No. 10-2006-0012353.

(Continued)

*Primary Examiner*—David García Cervetti
(74) *Attorney, Agent, or Firm*—Westerman, Hattori, Daniels & Adrian, LLP

(57) ABSTRACT

Authorized persons are recognized based on unique identifiers allocated to the authorized persons and biological information of the authorized persons and a database of identifiers and biological information of authorized persons. When a person provides his identifier, biological information corresponding to the provided identifier is retrieved from the database and writing in a storage unit. Then, when the person provides his biological information, it is checked whether provided biological information matches with the biological information in the storage unit. When the two match, the person is recognized as an authorized person.

4 Claims, 10 Drawing Sheets

U.S. PATENT DOCUMENTS

| | | | | |
|---|---|---|---|---|
| 2004/0233039 | A1* | 11/2004 | Beenau et al. | 340/5.83 |
| 2004/0236699 | A1* | 11/2004 | Beenau et al. | 705/64 |
| 2004/0236700 | A1* | 11/2004 | Beenau et al. | 705/64 |
| 2004/0236701 | A1* | 11/2004 | Beenau et al. | 705/64 |
| 2004/0238621 | A1* | 12/2004 | Beenau et al. | 235/380 |
| 2004/0239480 | A1* | 12/2004 | Beenau et al. | 340/5.53 |
| 2004/0239481 | A1* | 12/2004 | Beenau et al. | 340/5.53 |
| 2004/0252012 | A1* | 12/2004 | Beenau et al. | 340/5.4 |
| 2004/0257197 | A1* | 12/2004 | Beenau et al. | 340/5.53 |
| 2005/0033687 | A1* | 2/2005 | Beenau et al. | 705/39 |
| 2005/0116024 | A1* | 6/2005 | Beenau et al. | 235/380 |
| 2005/0116810 | A1* | 6/2005 | Beenau et al. | 340/5.52 |
| 2005/0253683 | A1* | 11/2005 | Lowe | 340/5.53 |
| 2006/0055552 | A1* | 3/2006 | Chung et al. | 340/686.1 |
| 2007/0001854 | A1* | 1/2007 | Chung et al. | 340/572.1 |

FOREIGN PATENT DOCUMENTS

| | | |
|---|---|---|
| CN | 1178407 | 4/1998 |
| CN | 1221160 | 6/1999 |
| CN | 1305045 | 7/2001 |
| JP | 2003-44442 | 2/2003 |
| JP | 2004-324183 | 11/2004 |
| JP | 2005-053077 | 3/2005 |
| JP | 2005-148982 | 6/2005 |
| JP | 2005-208995 | 8/2005 |

OTHER PUBLICATIONS

Chinese Office Action dated Aug. 31, 2007, Application No. 200610007370.3.

* cited by examiner

FIG. 3

| ID NUMBER | BIOLOGICAL INFORMATION |
|---|---|
| 11111 | BODYA |
| 22222 | BODYB |
| 33333 | BODYC |
| ... | |
| ... | |

FIG. 4

| BIOLOGICAL INFORMATION |
|---|
| BODYC |
| BODYA |
| ... |
| ... |

PREDETERMINED NUMBER

FIG. 7

| ID NUMBER | BIOLOGICAL INFORMATION |
|---|---|
| 11111 | BODY A |
| 33333 | BODY C |
| ... | |
| ... | |

DEVICE, METHOD, AND COMPUTER PRODUCT FOR MATCHING BIOLOGICAL INFORMATION

BACKGROUND OF THE INVENTION

1. Field of the Invention

The invention relates to a technology for recognizing a person by using biological information, such as pulse rate, fingerprints, iris pattern, of that person.

2. Description of the Related Art

The technology for recognizing a person (or other living beings) by using biological information of that person has been attracting attention. The biological information includes, for example, pulse rate, fingerprints, iris pattern. Biometric devices are used to acquire the biological information of persons.

One approach in recognizing a person by using biological information of that person is to acquire his biological information and check if biological information that matches with the acquired biological information exists in a database prepared beforehand. However, this approach is time-consuming if the database contains a large volume of data.

Another approach is to allocate identification numbers (IDs) to persons and store IDs and biological information of persons in a correlated manner in a database. When a person provides his ID and biological information, biological information corresponding to the provided ID is retrieved from the database, and it is checked if the provided biological information matches with the retrieved biological information retrieved. If the two match, that person is recognized as an authorized person. The trouble of manually inputting the ID can be eliminated by storing an ID in a wireless IC tag (RFID) are reading the ID from the IC tag. Such a technology has been disclosed in Japanese Published Unexamined Patent Application No. 2005-148982.

SUMMARY OF THE INVENTION

It is an object of the present invention to at least solve the problems in the conventional technology.

According to an aspect of the present invention, a biological information matching device that recognizes authorized persons based on unique identifiers allocated to the authorized persons and biological information of the authorized persons and a database of identifiers and biological information of authorized persons, includes a storage unit configured to store therein at least biological information; a retrieving unit configured to retrieve from the database biological information corresponding to an identifier acquired from a person, and to write retrieved biological information in the storage unit; and a matching unit that checks if biological information acquired from a person matches with the biological information in the storage unit to thereby decide whether the person is the authorized person.

According to another aspect of the present invention, a biological information matching method of recognizing authorized persons based on unique identifiers allocated to the authorized persons and biological information of the authorized persons and a database of identifiers and biological information of authorized persons includes retrieving biological information corresponding to an identifier acquired from a person from the database; writing retrieved biological information in a storage unit; and checking if biological information acquired from a person matches with the biological information in the storage unit to thereby decide whether the person is the authorized person.

According to still another aspect of the present invention, a computer-readable recording medium stores therein a computer program that implements a biological information matching method according to the present invention on a computer.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is an example of the contents of a biological information table shown in FIG. 2;

FIG. 4 is an example of the contents of a matching table shown in FIG. 2;

FIG. 7 is an example of the contents of a matching table shown in FIG. 6;

DETAILED DESCRIPTION OF THE PREFERRED EMBODIMENTS

Exemplary embodiments of the invention shall now be explained in detail with reference to the accompanying drawings. A case has been explained below in which it is checked based on biological information whether an entry wisher is to be allowed to enter into an entry-restricted room. The entry-restricted room is a room in which only authorized persons are allowed to enter. The entry wisher is an authorized person that wishes to enter the entry-restricted room. However, the present invention can be similarly applied to other situations.

Figure 1:
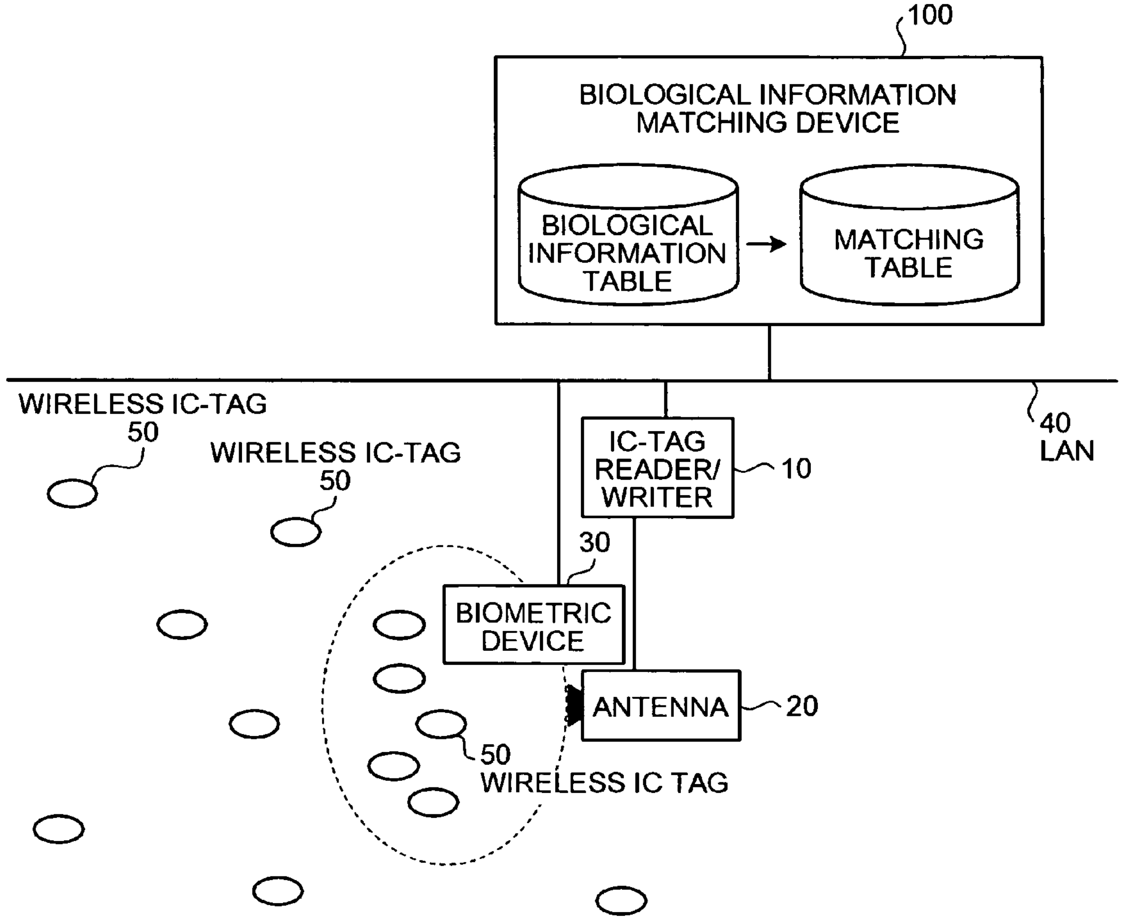
FIG. 1 is a schematic for explaining the general concepts of a biometric system according to a first embodiment of the present invention.

FIG. 1 is a schematic for explaining the general concepts of a biometric system according to a first embodiment of the present invention. The biometric system includes a biometric device 30, a UHF-band wireless IC-tag reader/writer 10, and a biological information matching device 100. The biometric device 30, the IC-tag reader/writer 10, and the biological information matching device 100 are connected to each other via a LAN 40.

All the authorized persons who are authorized to enter the entry-restricted room are given identity cards, or something, into which an UHF-band wireless IC-tag 50 is embedded. A unique ID number is written in each wireless IC-tag 50.

The IC-tag reader/writer 10 and the biometric device 30 are generally arranged near the entrance of the entry-restricted room. The entrance of the entry-restricted room is generally in locked state.

When an entry wisher wants to enter the entry-restricted room, he passes, with his ID card, near the IC-tag reader/writer 10. An antenna 20 of the IC-tag reader/writer 10 catches a signal from the wireless IC-tag 50 possessed by the entry wisher, whereby, the IC-tag reader/writer 10 reads the ID number of the entry wisher. The IC-tag reader/writer 10 sends the read ID number to the biological information matching device 100 via the LAN 40.

When the IC-tag reader/writer 10 is successful in reading the ID number of the entry wisher, he is asked to go to the biometric device 30 to get his biological information read.

The biometric device 30 reads the biological information of the entry wisher and sends the read biological information to the biological information matching device 100.

The biological information matching device 100 manages two databases: a biological information table and a matching table. The biological information table is a larger and permanent database while the matching table is a smaller and temporary database. The biological information table is a database of biological information and ID numbers of the authorized persons. A portion of the data in the biological information table is temporarily stored in the matching database from time to time.

Upon receiving an ID number from the biometric device 30, the biological information matching device 100 retrieves from the biological information table biological information corresponding to the received ID number and stores the retrieved biological information in the matching table. Then upon receiving the biological information of the entry wisher from the biometric device 30, the biological information matching device 100 checks whether the received biological information matches with the biological information in the matching table. If the two match, the biological information matching device 100 outputs a signal to unlock the entrance of the entry-restricted room. If the two do not match, or when an ID number of the entry wisher can not be read, the entrance of the entry-restricted room in not unlocked.

Thus, the biological information matching device 100 does not directly check whether the received biological information matches with the biological information in the biological information table.

There is generally a time lag between the biological information matching device 100 receiving the ID number and receiving the biological information of the entry wisher. In other words, the ID number is received first and then the biological information of the entry wisher is received. During that time, the biological information matching device 100 retrieves from the biological information table biological information corresponding to the received ID number and stores the retrieved biological information in the matching table. As a result, the process can be speedup as compared to a case when biological information is retrieved from the biological information table performed after receiving the biological information of the entry wisher.

It is preferable that the matching table 140 can store up to a predetermined number of pieces, for example, ten pieces of biological information. Oldest entry in the matching table 140 is deleted when storing a new entry.

The use of the UHF band RFID eliminates the need for the entry wisher to come very close to the IC-tag reader/writer 10. Thus, the IC-tag reader/writer 10 need not be arranged very close to the entrance of the entry-restricted room.

A universal serial bus (USB) or any other communications interface can be used instead of the LAN 40.

Figure 2:
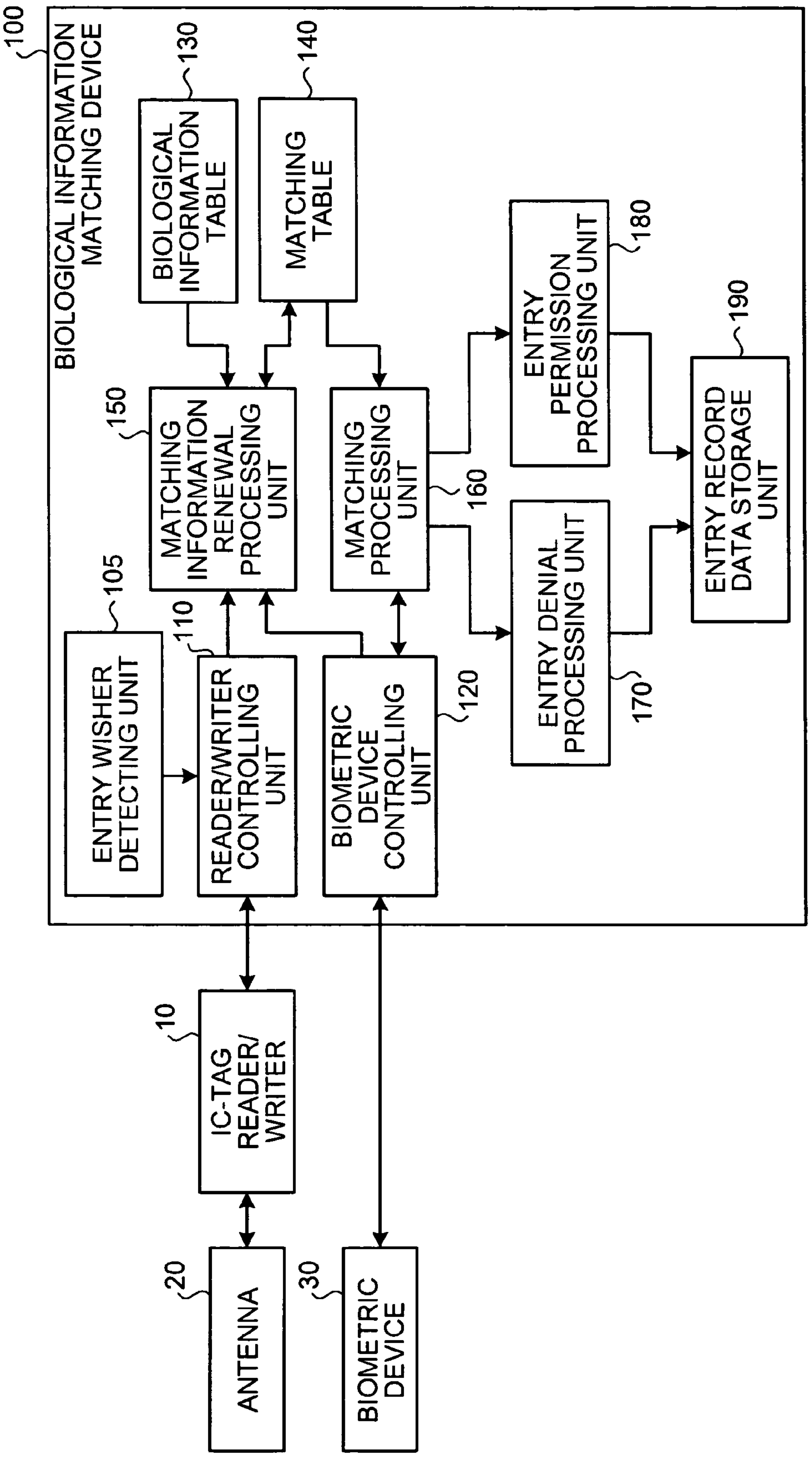
FIG. 2 is a functional block diagram of a biological information matching device shown in FIG. 1.

FIG. 2 is a functional block diagram of the biological information matching device 100. The biological information matching device 100 includes an entry wisher detecting unit 105, a reader/writer controlling unit 110, a biometric device controlling unit 120, a biological information table 130, a matching table 140, a matching information renewal processing unit 150, a matching processing unit 160, an entry denial processing unit 170, an entry permission processing unit 180, and an entry record data storage unit 190.

The entry wisher detecting unit 105 includes a sensor (not shown) arranged preferably near the entrance of the entry-restricted room. The sensor is configured to detect the entry wisher. Upon detecting the entry wisher, the entry wisher detecting unit 105 outputs an entry wisher detection signal indicative of detection of the entry wisher to the reader/writer controlling unit 110.

Upon receiving an entry wisher detection signal from the entry wisher detecting unit 105, the reader/writer controlling unit 110 boots the IC-tag reader/writer 10. As a result, the antenna 20 of the IC-tag reader/writer 10 catches signals emitted from the UHF band wireless IC tag 50 of the ID card of the entry wisher so that the IC-tag reader/writer 10 reads the ID number of the entry wisher. The IC-tag reader/writer 10 sends the read ID number to the matching information renewal processing unit 150 via the reader/writer controlling unit 110.

The biometric device controlling unit 120 receives the biological information of the entry wisher from the biometric device 30, and sends the received biological information to the matching processing unit 160. The biometric device 30 includes an ID number reading device (not shown). If the biological information corresponding to the ID number read by the IC-tag reader/writer 10 does not match the biological information read by the biometric device 30, the biometric device controlling unit 120 instructs the ID number reading device of the biometric device 30 to read the ID number.

The biological information table 130 stores biological information of authorized persons. FIG. 3 is an example of the contents of the biological information table 130. The biological information table 130 stores ID numbers and biological information of authorized persons in a correlated manner. For example, the biological information of a person with ID number 11111 is BODYA.

The matching table 140 temporarily stores a few pieces, for example, ten, of biological information. As a result, 10 entry wishers can be taken care of at one time. Oldest information is deleted when new information is to be stored in the matching table 140. FIG. 4 is an example of the contents of the matching table 140. The matching table 140 stores a few pieces, say ten, of biological information read from the biological information table 130. In the example, biological information BODYC, BODYA, etc., which have been read from the biological information table 130, are stored in the matching table 140.

The matching information renewal processing unit 150 reads the biological information, corresponding to the ID number received from the reader/writer controlling unit 110, from the biological information table 130 and writes the biological information in the matching table 140. If the maximum number of pieces of biological information is already stored in the matching table 140, the matching information renewal processing unit 150 deletes the oldest biological information from the matching table 140 and then stores the new biological information in the matching table 140.

The matching processing unit 160 is a processing unit that checks the matching of the biological information received from the biometric device controlling unit 120 with the biological information in the matching table 140. If there is a match, the matching processing unit 160 instructs the entry permission processing unit 180 to perform an entry permitting process. If there is no match, the matching processing unit 160 instructs the entry denial processing unit 170 to perform an entry denying process.

By the matching information renewal processing unit 150 reading the biological information, corresponding to the ID number received from the reader/writer controlling unit 110, from the biological information table 130 and writing the biological information in the matching table 140 and the matching processing unit 160 performing the matching using only the biological information stored in the matching table 140, the matching process can be made high in speed.

The entry denial processing unit 170 performs the process of denying the entry of the entry wisher based on the instruction from the matching processing unit 160 and performs processes such as displaying an entry denial message and recording an entry denial record.

The entry permission processing unit 180 performs the process of permitting entry of the entry wisher based on the instruction from the matching processing unit 160 and performs processes such as unlocking the door used for entry and recording an entry record.

The entry record data storage unit 190 stores the entry record, entry denial record, etc. and is used to analyze the circumstances of entry into the room of restricted entry.

Figure 5:
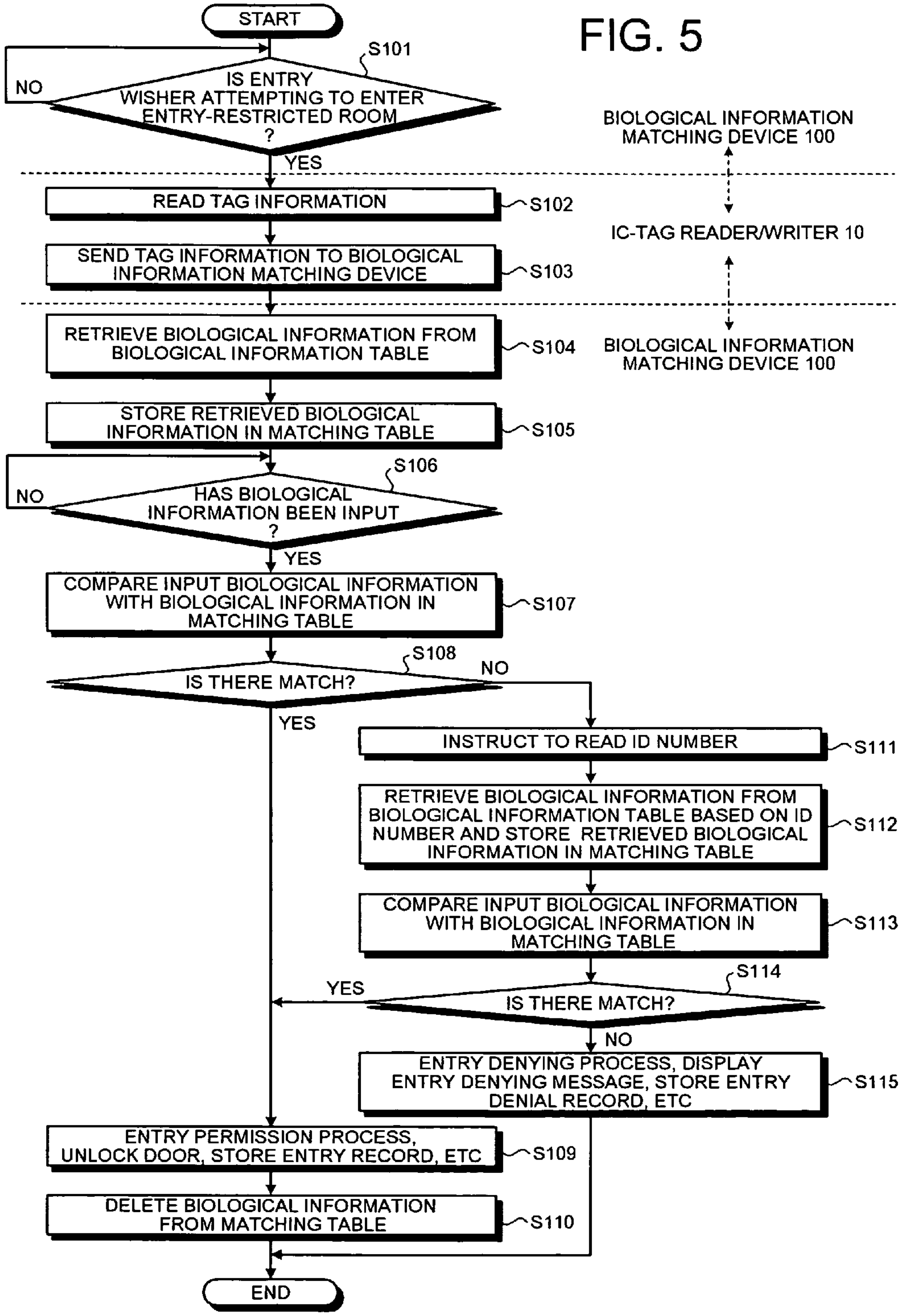
FIG. 5 is a flowchart of a process procedure performed by the biometric system shown in FIG. 1.

FIG. 5 is a flowchart of a process procedure performed by the biometric system shown in FIG. 1. When the entry wisher detecting unit 105 of the biological information matching device 100 detects that the entry wisher is attempting to enter the entry-restricted room (Yes in step S101), the reader/writer controlling unit 110 instructs the IC-tag reader/writer 10 to read the wireless IC tag 50 and the IC-tag reader/writer 10 reads the information of the wireless IC tag 50 (step S102).

The IC-tag reader/writer 10 then sends the read ID number to the biological information matching device 100 (step S103). The matching information renewal processing retrieves biological information from the biological information table 130 (step S104) based on the ID number, and stores the retrieval biological information in the matching table 140 (step S105).

Thereafter, when the entry wisher makes his biological information be recognized by the biometric device 30, the read biological information is sent to the biological information matching device 100, and when the biometric device controlling unit 120 of the biological information matching device 100 receives the input biological information (Yes in step S106), the matching processing unit 160 receives the input biological information from the biometric device controlling unit 120 and compares the input biological information with the biological information in the matching table 140 (step S107).

The matching processing unit 160 then judges whether there is a match for the input biological information in the matching table 140 (step S108). When there is a match, the entry permission processing unit 180 performs the entry permitting process of unlocking the door, storing an entry record, etc., (step S109) and the matching processing unit 160 deletes the biological information, for which matching was successful, from the matching table 140 (step S110).

When there is no match, the matching processing unit 160 instructs the biometric device controlling unit 120 to read the ID number from the ID number reading device equipped in the biometric device 30 (step S111). The biometric device controlling unit 120 then hands over the ID number read by the ID number reading device to the matching information renewal processing unit 150 and the matching information renewal processing unit 150 retrieves biological information from the biological information table 130 based on the ID number and stores the retrieved biological information in the matching table 140 (step S112).

The matching processing unit 160 then compares the input biological information with the biological information in the matching table 140 (step S113) and judges whether there is a match for the input biological information in the matching table 140 (step S114). When there is a match, step S109 is performed. When there is no match, the entry denial processing unit 170 performs the entry denying process of displaying the entry denial message, recording an entry denial record, etc., (step S115), and the process is terminated.

Thus, because the entry wisher detecting unit 105 detects a entry wisher who attempts to enter the entry-restricted room, and notifies this to the reader/writer controlling unit 110, the notified reader/writer controlling unit 110 controls the IC-tag reader/writer 10 to read the ID number from the UHF band wireless IC tag 50 held by the entry wisher, the matching information renewal processing unit 150 uses the ID number, which the IC-tag reader/writer 10 read from the wireless IC tag 50, to read biological information to be subject to matching from the biological information table 130 and stores the biological information in advance in the matching table 140, and when biological information is thereafter sent from the biometric device 30, the matching processing unit 160 checks the matching of the biological information read by the biometric device 30 with the biological information stored in the matching table 140, the number of pieces of biological information subject to matching can be reduced and the matching process can be carried out at high speed.

A case has been explained above in which the biological information of the ID number read from the wireless IC tag 50 by the IC-tag reader/writer 10 is successively read from the biological information table 130 and stored in the matching table 140. However, instead of successively storing the biological information in the matching table, the biological information of all entry wishers present in a predetermined area can be stored in the matching table. A second embodiment of the present invention considers this situation.

Figure 6:
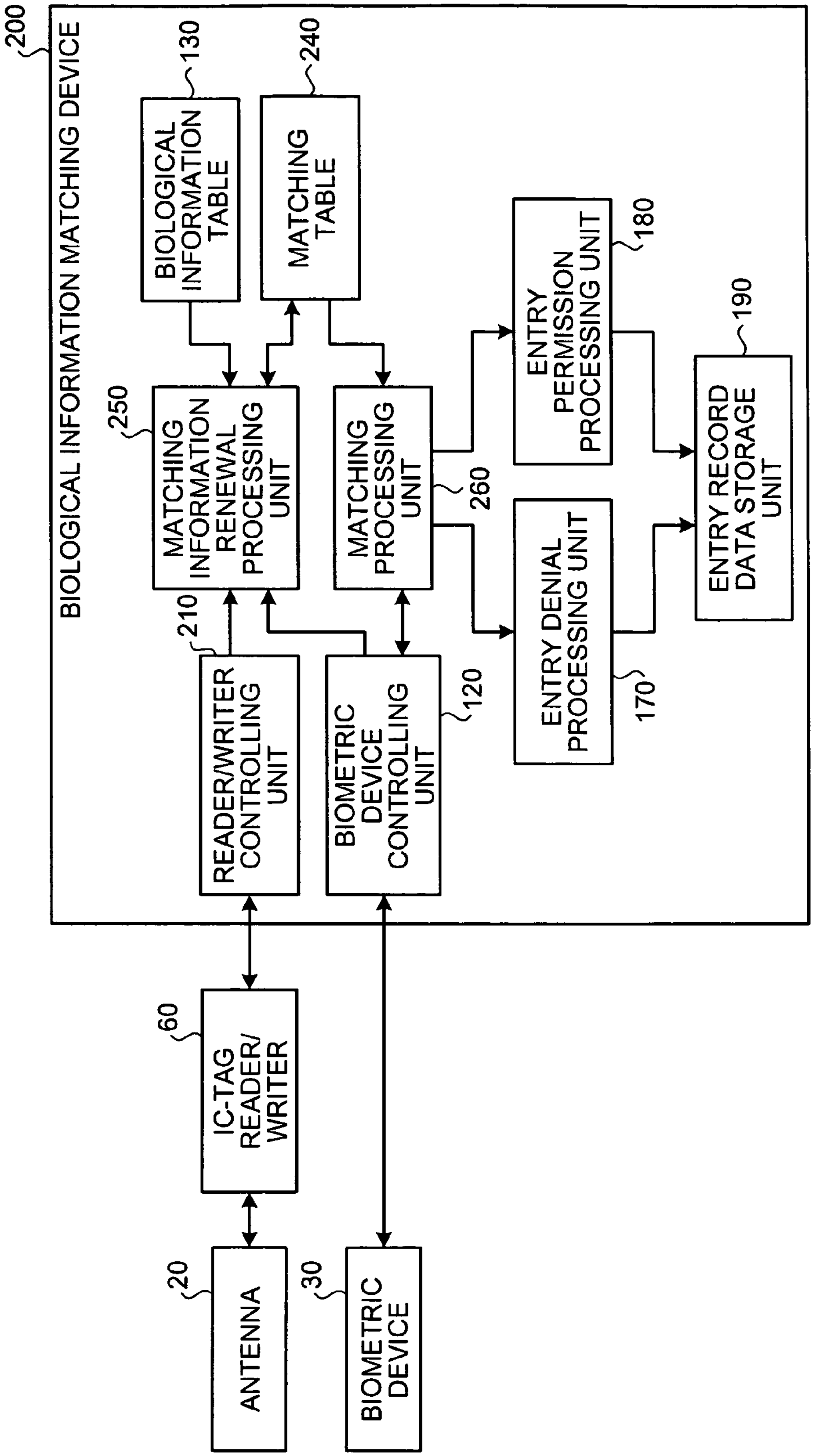
FIG. 6 is a functional block diagram of a biological information matching device according to a second embodiment of the present invention.

FIG. 6 is a functional block diagram of a biological information matching device 200 according to the second embodiment. The biological information matching device 200 includes a reader/writer controlling unit 210, the biometric device controlling unit 120, the biological information table 130, a matching table 240, a matching information renewal processing unit 250, a matching processing unit 260, the entry denial processing unit 170, the entry permission processing unit 180, and the entry record data storage unit 190. For the sake of explanation, functional units serving the same roles as the respective units shown in FIG. 2 shall be provided with the same symbols and detailed explanation thereof shall be omitted.

The reader/writer controlling unit 210 instructs an IC-tag reader/writer 60 to read wireless IC tags 50. Such an instruction is output repeatedly at a fixed interval. In comparison to the IC-tag reader/writer 10, the IC-tag reader/writer 60 is configured to read wireless IC tags 50 across a wider area.

The matching table 240 stores the biological information, the ID numbers of which have been read from the wireless IC tags 50. FIG. 7 is an example of the contents of the matching table 240. The matching table 240 stores ID numbers and biological information in corresponding manner.

The matching information renewal processing unit 250 renews the matching table 240 so that only the biological information corresponding to the newest ID numbers read from the wireless IC tags 50 by the IC-tag reader/writer 60 are stored in the matching table 240.

Specifically, the matching information renewal processing unit 250 receives the ID numbers that have been read from the wireless IC tags 50 in a fixed period and compares the received ID numbers with the ID numbers stored in the matching table 240. If a received ID number does not exist in the matching table 240, the matching information renewal processing unit 250 reads the biological information of that ID number from the biological information table 130 and stores the biological information in the matching table 240, and if there is an ID number in the matching table 240 that is not an ID number that has been received, that ID number and the corresponding biological information are deleted from the matching table 240.

By the matching information renewal processing unit 250 thus renewing the matching table 240 so that only the biological information, corresponding to the newest ID numbers read from the wireless IC tags 50 by the IC-tag reader/writer 60, are stored in the matching table 240, when a wireless IC tag 50 holder who has no wish to enter the room enters the reading range of the IC-tag reader/writer 60 by chance, the biological information of the person can be prevented from being stored in the matching table 240 and be subject to matching.

The matching processing unit 260 matches the biological information sent from the biometric device 30 with the biological information stored in the matching table 240.

Figure 8:
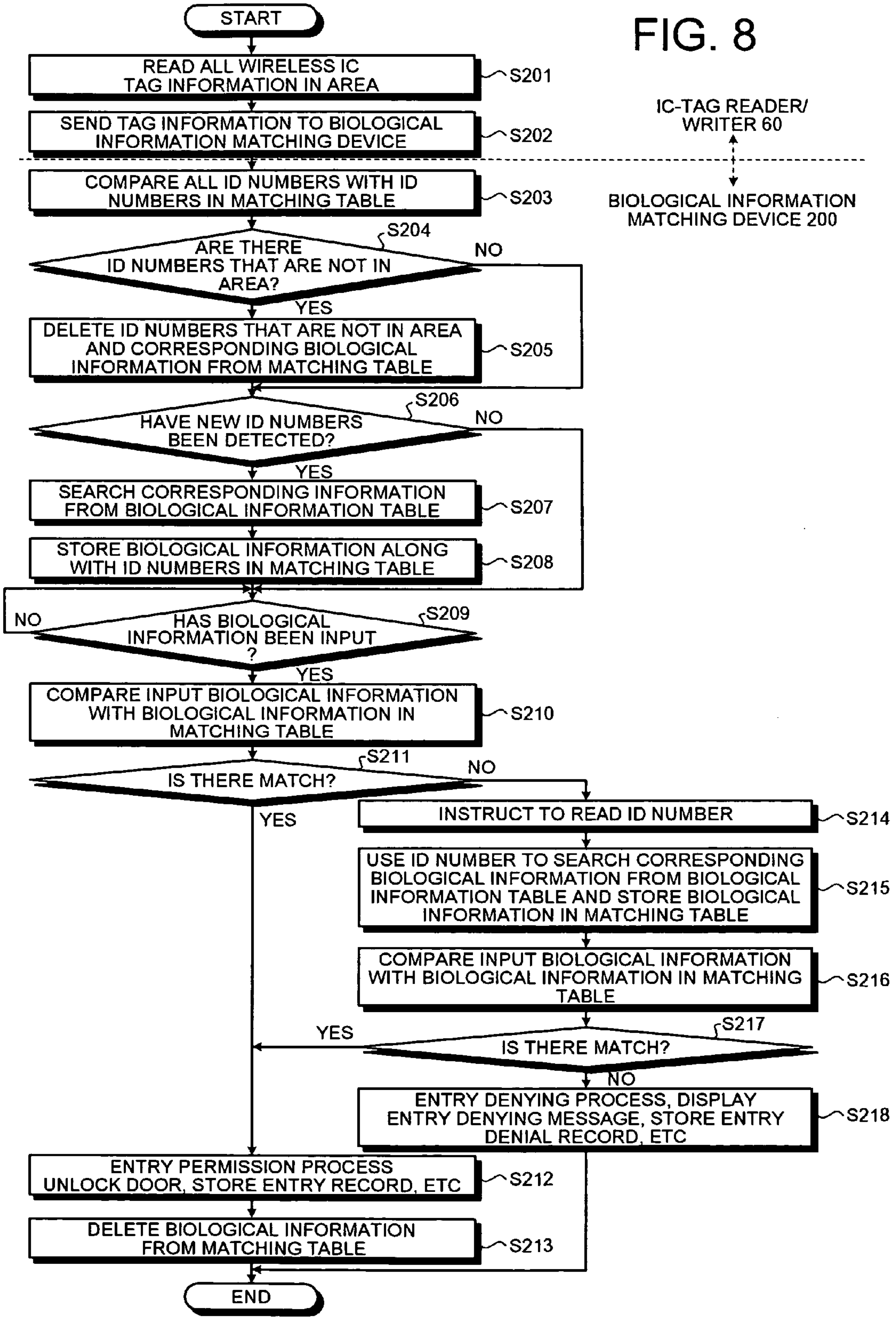
FIG. 8 is a flowchart of a process procedure performed by a biometric system according to the second embodiment.

FIG. 8 is a flowchart of a process procedure performed by the biometric system according to the second embodiment. The IC-tag reader/writer 60 reads all the wireless IC tags 50 existing in a predetermined area (region) at a fixed interval based on the instruction of the reader/writer controlling unit 210 of the biological information matching device 200 (step S201) and sends all the tag information that have been read, that is, all the ID numbers to the biological information matching device 200 (step S202).

The matching information renewal processing unit 250 that has received the ID numbers via the reader/writer controlling unit 210 then compares all the received ID numbers with the ID numbers in the matching table 240 (step S203), and if there are ID numbers in the matching table 240 that are not in the area (Yes in step S204), the ID numbers and the corresponding biological information are deleted from the matching table 240 (step S205).

If there are new ID numbers in the area that do not exist in the matching table 240 (Yes in step S206) the biological information of the ID numbers are searched from the biological information table 130 (step S207) and stored along with the ID numbers in the matching table 240 (step S208).

Thereafter, in the processes of steps S209 to S218, the biological information matching device 200 performs matching of the biological information sent from the biometric device 30 and the entry permitting process or the entry denying process in the same manner as in steps S106 to S115 of the processing procedures shown in Table 5, with the exception of using the matching table 240 in place of the matching table 140.

Thus, because the reader/writer controlling unit 210 uses the IC-tag reader/writer 60 to read the wireless IC tags 50 existing in the predetermined area in at the fixed interval and the matching information renewal processing unit 250 renews the matching table 240 so that the biological information of the newest ID numbers read from the wireless IC tags 50 will be subject to matching, the matching table 240 can be prepared to cover only the entry wishers that enter within the predetermined area and the subjects to be matched can thus be narrowed down appropriately.

A case has been explained above in which the IC-tag reader/writer 60 reads all the wireless IC tags 50 existing in the predetermined area. In this case, however, there can be a large number of wireless IC tags in the area. It can be preferable to restrict the number of IC tags to be read. A third embodiment of the present invention considers this situation.

Figure 9:
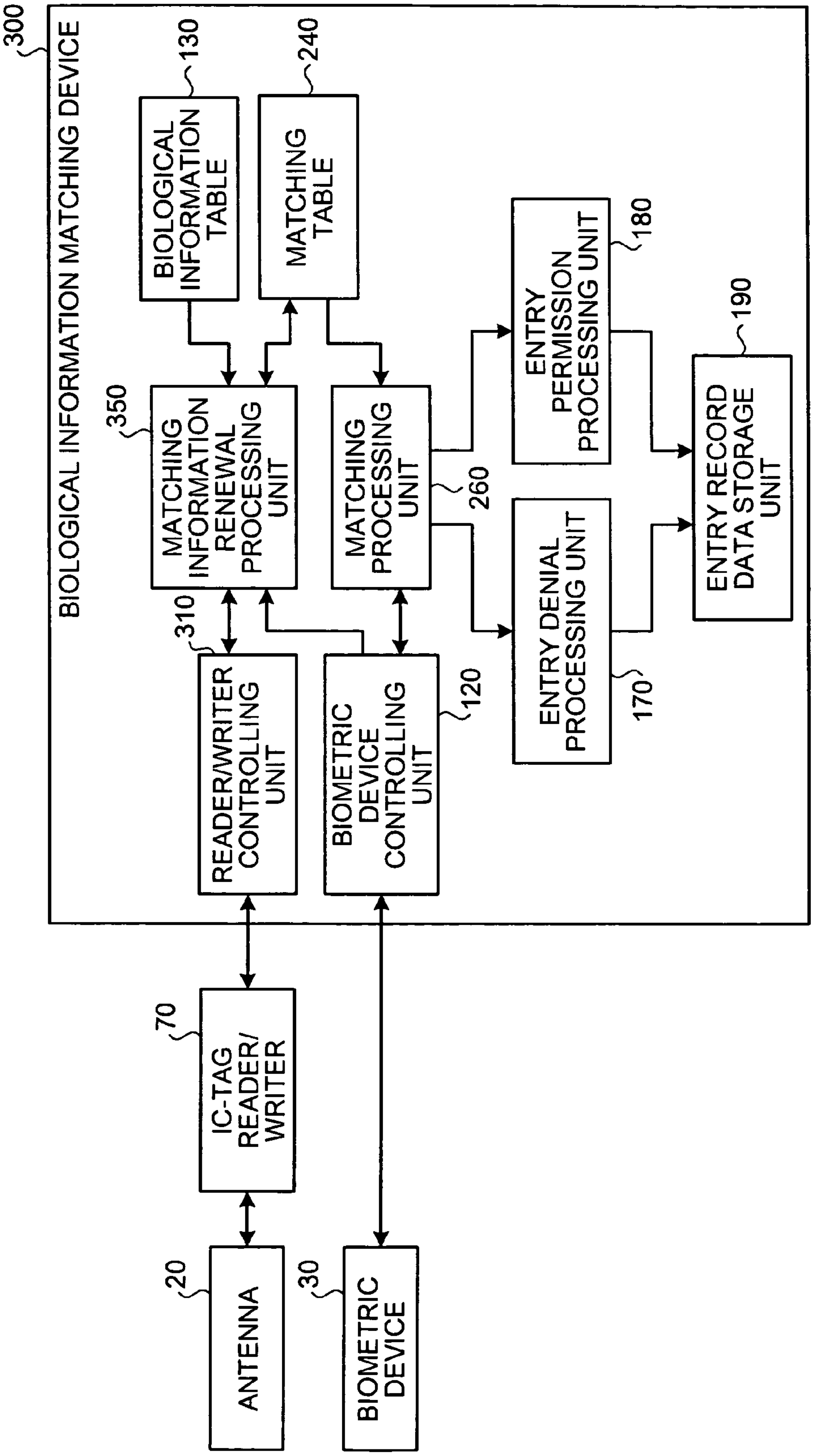
FIG. 9 is a functional block diagram of a biological information matching device according to a third embodiment of the present invention.

FIG. 9 is a functional block diagram of a biological information matching device 300 according to the third embodiment. The biological information matching device 300 includes a reader/writer controlling unit 310 in place of the reader/writer controlling unit 210 and a matching information renewal processing unit 350 of the matching information renewal processing unit 250.

The reader/writer controlling unit 310 instructs an IC-tag reader/writer 70 to read wireless IC tags 50 at a fixed interval and instructs the IC-tag reader/writer 70 to change its reading power. That is, the reading power, or reading range, of the IC-tag reader/writer 70 is adjustable. The reading power can be changed by changing the strength of radio waves that are output for reading when reading the wireless IC tags 50.

The matching information renewal processing unit 350 renews the matching table 240 so that only the biological information corresponding to the newest ID numbers that the IC-tag reader/writer 70 read from the wireless IC tags 50 will be stored in the matching table 240 and instructs the reader/writer controlling unit 310 so that the number of wireless IC tags 50 read at one time will be within five. The number of wireless IC tags to be read at one time is optional.

By the matching information renewal processing unit 350 instructing the reader/writer controlling unit 310 so that the number of wireless IC tags 50 read at one time is within five, an unnecessarily large number of pieces of biological information can be prevented from being subject to matching.

Figure 10:
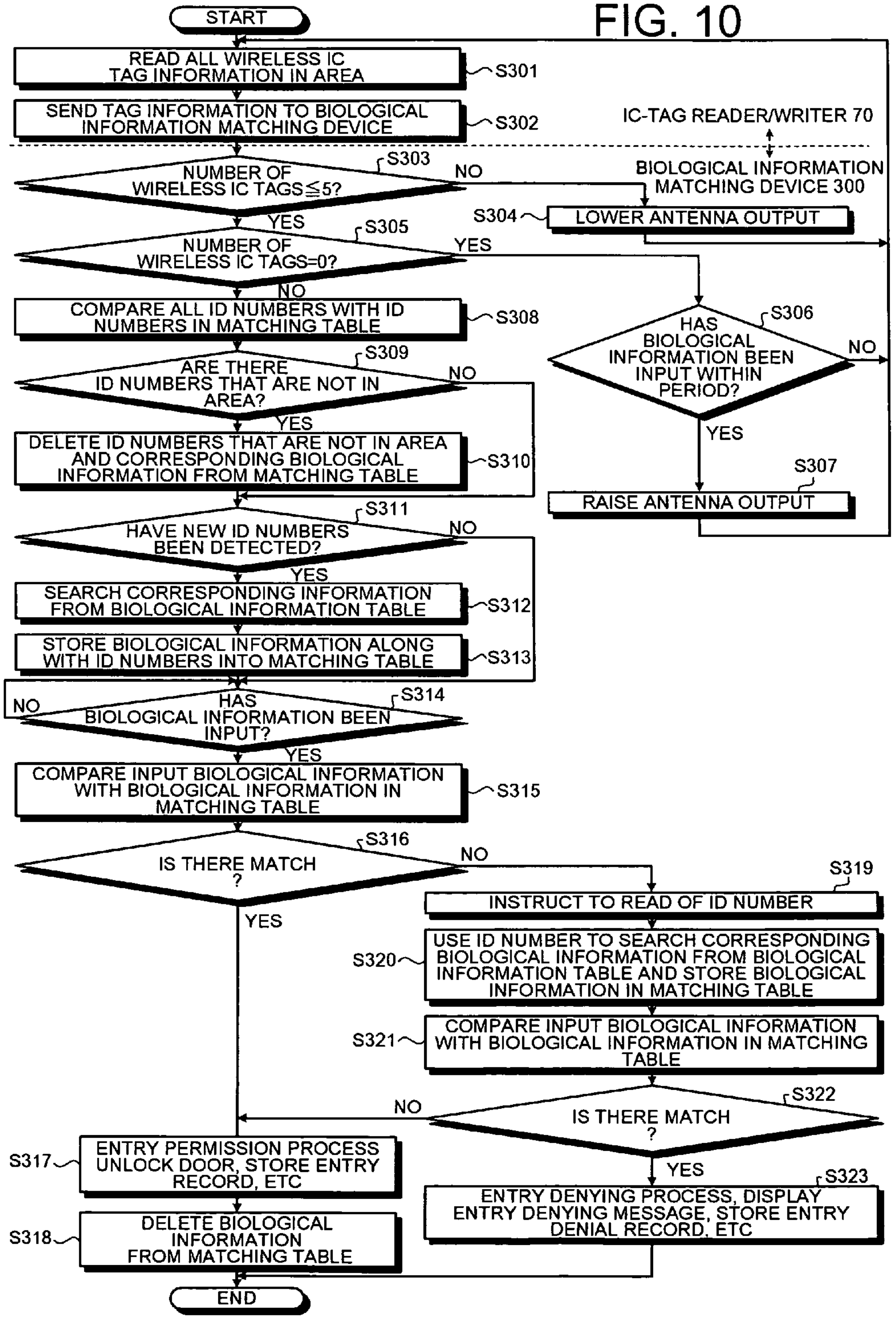
FIG. 10 is a flowchart of a process procedure performed by a biometric system according to the third embodiment.

FIG. 10 is a flowchart of a process procedure performed by a biometric system according to the third embodiment. The IC-tag reader/writer 70 reads all the wireless IC tags 50 existing in a predetermined area (region) in a fixed period based on the instruction of the reader/writer controlling unit 310 of the biological information matching device 300 (step S301) and sends all the tag information that have been read, that is, all the ID numbers to the biological information matching device 300 (step S302).

The matching information renewal processing unit 350 that has received the ID numbers via the reader/writer controlling unit 310 then judges whether the number of wireless IC tags 50 read by the IC-tag reader/writer 70 is within five (step S303) and if the number is not within five, instructs the IC-tag reader/writer 70 via the reader/writer controlling unit 310 to reread upon lowering the reading output (step S304).

Meanwhile, if the number of wireless IC tags 50 read by the IC-tag reader/writer 70 is within five, the matching information renewal processing unit 350 judges whether the number is zero (step S305), and if the-number is zero, waits only for the period of reading the wireless IC tags 50 and judges whether biological information has been input within the period (step S306).

If it is judged that biological information has been input, because it can then be considered that the reading of the wireless IC tags 50 has failed, the IC-tag reader/writer 70 is instructed, via the reader/writer controlling unit 310, to reread upon raising the reading output (step S307). If biological information has not been input, since it can then be considered that there are no entry wishers, a return to step S301 is performed and the reading of the wireless IC tags 50 of the next period is performed.

If the number of wireless IC tags 50 that were read by the IC-tag reader/writer 70 is not zero, the renewal of the matching table 240, the matching of the biological information sent from the biometric device 30, and the entry permitting process or the entry denying process is performed in step S308 to step S323 in the same manner as in step S203 to step S218 shown in FIG. 8.

Thus, since. the matching information renewal processing unit 350 controls the output of the IC-tag reader/writer 70 via the reader/writer controlling unit 310 based on the number of wireless IC tags 50 read by the IC-tag reader/writer 70, the wireless IC tags 50 can be read in accordance with changes in the reading environment.

The biological information matching device according to the above embodiments can be implemented on a computer. A computer that can realize the biological information matching device shall now be explained.

Figure 11:
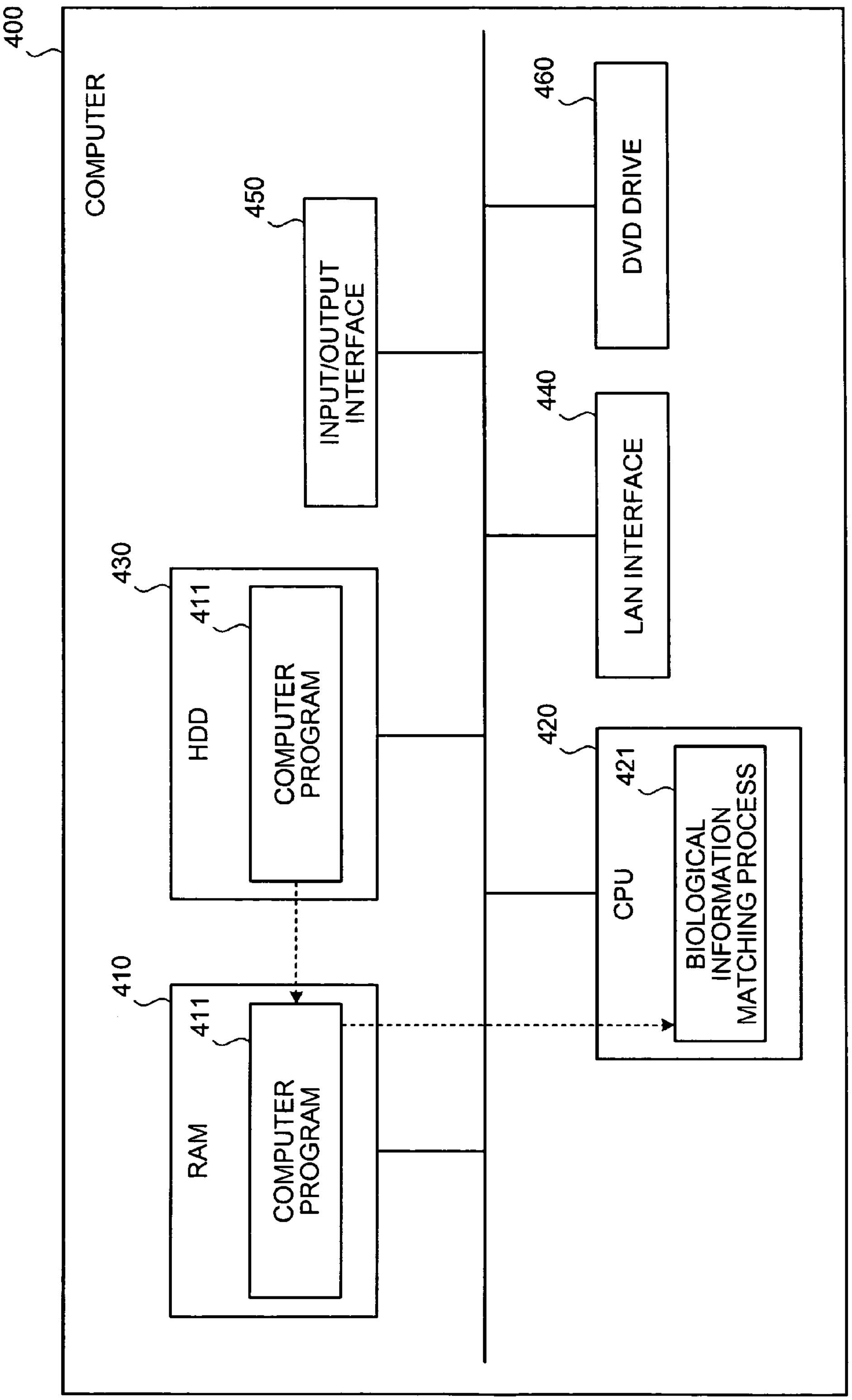
FIG. 11 is a functional block diagram of a computer that the methods according to the above embodiments.

FIG. 11 is a functional block diagram the computer that executes a computer program to realize the biological information matching device. The computer 400 includes a RAM 410, a CPU 420, an HDD 430, a LAN interface 440, an input/output interface 450, and a DVD drive 460.

The RAM 410 stores the computer program and intermediate execution results of the computer program, and the CPU 420 reads the computer program from the RAM 410 and executes the computer program.

The HDD 430 is a disk device that stores the computer program and data, and the LAN interface 440 connects the computer 400 via the LAN 40 to the biometric device 30, the reader/writer, another computer, etc.

The computer program 411 can be stored on a DVD or the like and can be installed in the computer 400 when necessary.

On the other hand, the computer program 411 can be stored in a storage device of another computer system connected via the LAN interface 440 and installed in the computer 400 when necessary.

The computer program 411 is stored in the HDD 430, read by the RAM 410, and executed by the CPU 420 as a biological information matching process 421.

The invention can be applied in various situation. For example, invention can be applied to verify a bank customer who wishes to withdraw cash from the bank ATM.

However, even if the biological information search is made high in speed by the use of ID numbers, much time is still required for a process of searching for the biological information to be compared from among a large amount of biological information.

According to the embodiments, the processing time required for matching can be reduced because matching is performed after the biological information to be subject to matching is narrowed down in advance.

Moreover, the processing time required for matching can be reduced because matching is performed after the biological information to be subject to matching is narrowed down in advance to within a predetermined number of pieces of information.

Furthermore, the processing time required for matching can be reduced because persons within a predetermined range are checked for matching.

Moreover, the processing time required for matching can be reduced because matching is performed after the biological information to be subject to matching is appropriately narrowed down.

Furthermore, the processing time required for matching can be reduced because the number of pieces of biological information to be subject to matching is appropriately restricted.

Moreover, RFID tag reading errors can be reduced because an RFID tag is read in accordance with changes of the reading environment.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A biological information matching device that recognizes authorized persons based on unique identifiers allocated to the authorized persons and biological information of the authorized persons, the biological information matching device comprising:

a database of the unique identifiers and biological information of the authorized persons;

a temporary storage unit configured to store therein a portion of the database temporarily;

an identifier reader configured to read an identifier of a person from an RFID IC tag carried by the person intermittently at predetermined interval;

a retrieving unit configured to retrieve from the database biological information corresponding to the identifier of the person upon receiving the identifier from the identifier reader, and to write retrieved biological information in the temporary storage unit, the retrieving unit deleting the oldest biological information from the temporary storage unit when storing new biological information in the temporary storage unit; and a matching unit that checks if biological information acquired from the person matches with the biological information in the temporary storage unit instead of the database to thereby decide whether the person is the authorized person.

2. The biological information matching device according to claim 1, further comprising a biological information reader configured to read biological information of persons.

3. The biological information matching device according to claim 1, wherein the temporary storage unit has a capacity substantially smaller than that of the database.

4. The biological information matching device according to claim 3, wherein the temporary storage unit has a capacity for storing only a predetermined number of biological information.

* * * * *